(No Model.)
H. J. BREWER.
GALVANIC BATTERY.
No. 380,085. Patented Mar. 27, 1888.
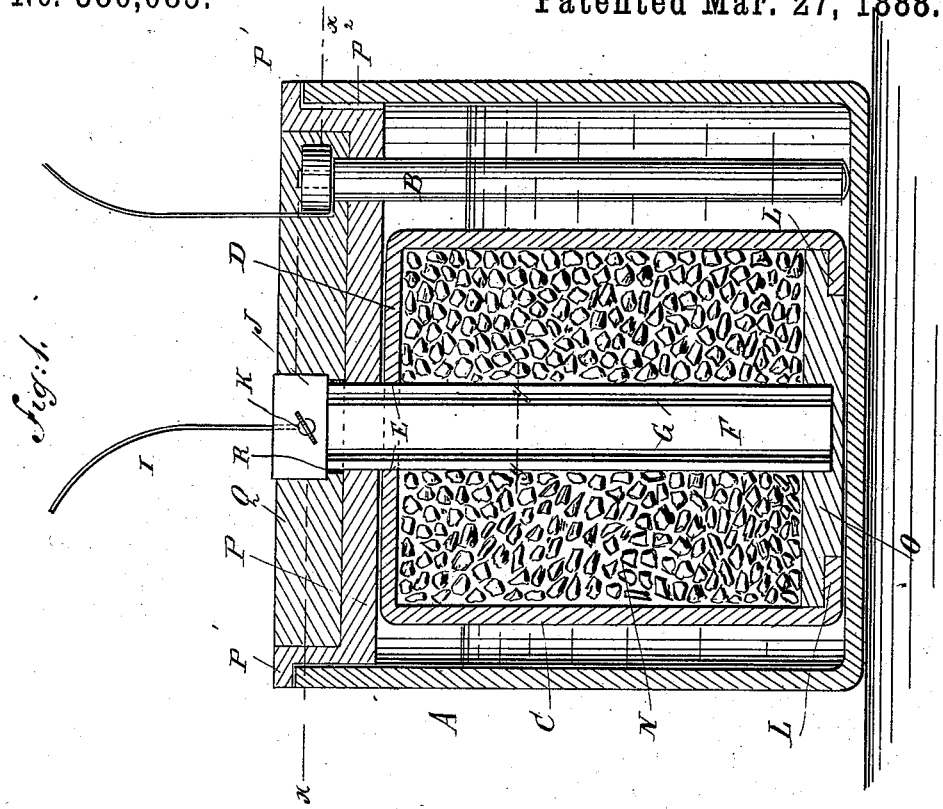
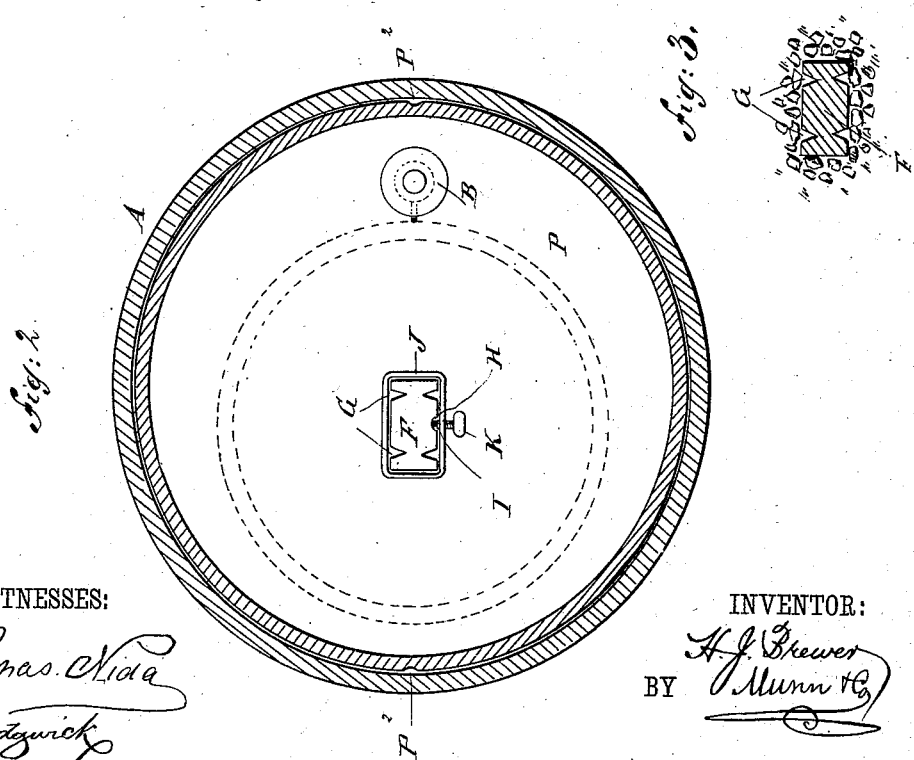
WITNESSES:
Chas. A. Nida
C. Sedgwick
INVENTOR:
H. J. Brewer
BY Munn & Co.
ATTORNEYS.

UNITED STATES PATENT OFFICE.

HORATIO J. BREWER, OF NEW YORK, N. Y.

GALVANIC BATTERY.

SPECIFICATION forming part of Letters Patent No. 380,085, dated March 27, 1888.

Application filed November 29, 1887. Serial No. 256,405. (No model.)

*To all whom it may concern:*

Be it known that I, HORATIO J. BREWER, of the city, county, and State of New York, have invented certain new and useful Improvements in Galvanic Batteries, of which the following is a full, clear, and exact description.

The object of my invention is to provide certain new and useful improvements in galvanic batteries, by which the electrodes are securely seated in place and the gases forming in the porous cup can readily escape, so as to prevent the adhesion of insulating bubbles on the negative electrode, and consequent polarization of the electrode, thereby rendering the battery very effective at all times.

The further object of my invention is to provide a porous cup which has its cover formed directly on the body part and is of the same material, thereby making the battery very simple and durable in construction.

The invention consists in the construction and arrangement of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of my improvement. Fig. 2 is a sectional plan view of the same on the lines $x\ x$ of Fig. 1, and Fig. 3 is a sectional plan view of the negative electrode on the line $y\ y$ of Fig. 1.

The galvanic battery is provided with a jar, A, of suitable material and size, and containing the positive electrode B, of any approved construction. In the jar A is also held the porous cup C, provided with a cover, D, directly formed on the body part of the porous cup C, and being of the same material as said body part.

In the middle of the cover D is formed an aperture, E, through which passes the negative conducting-electrode F, provided in one or more sides with grooves G, preferably extending throughout the length of the electrode F. In the outer end of the electrode F is formed a recess, H, into which extends one end of the conducting-wire I, and said outer end is surrounded by a clamp, J, carrying a screw, K, screwing against the said wire I, so as to hold the latter firmly in the recess H and in contact with the negative conducting-electrode F. The lower end of the porous cup C is preferably provided with an annular inwardly-extending flange, L, which forms a central recess, through which the negative material N is introduced into the porous cup C when the latter is placed upside down and after the conducting-electrode F is in position. The negative material N is firmly packed into the cup C in the usual manner, so that it surrounds the negative conducting-electrode F, but does not cover up the longitudinal grooves G, on account of said material being sufficiently larger than the width of the groove. After the material N is firmly packed into the cup C the opening formed by the flange L is closed by a sealing material, O, such as wax or hydraulic cement, which, after hardening, not only forms a solid bottom on the porous cup, but also holds the negative material N and the electrode F firmly in place.

On the upper end of the jar A is held a sealing-cup, P, provided with the annular flanges P', resting on the top edge of the jar A. In the bottom of the sealing-cup P are formed apertures for the passage of the upper ends of the electrodes B and F. On the outside of the cup P and on the under side of its flange P' is formed one or more grooves, $P^2$, which serve to let out the gases arising from the liquid contained in the jar A. When the positive and negative electrodes B and F and the cup P are in place on the jar A, I pour the sealing material Q, such as wax, &c., into the cup P, whereby the clamps on both electrodes are sealed.

In order to prevent the grooves G from being filled up by the sealing medium Q, I generally place a piece of paper or a rubber band, R, around that part of the electrode extending above the bottom of the sealing-cup P and not covered by the clamp J. The latter may, however, be made high enough to reach from the bottom of the sealing-cup P to the top of the sealing medium Q.

It will be seen that the gases, generally hydrogen, forming in the porous cup around the negative conducting-electrode F can easily escape to the outside by passing through the longitudinal grooves G, thus preventing the formation of insulating bubbles on the negative conducting-electrode F, as said gases generally form a coating on the exterior of the negative electrode F.

It will further be seen that the cover D of the porous cup C is always in place on account of being part of the body of the porous cup, and the said fixed cover has the advantage over the sealing material usually employed to close open porous cups, in that, it being porous in its structure, it furnishes by its own porosity a means for the escape of the gases generated in the cup, and that it acts as a safety-valve, thereby preventing the polarization of the cell, even if the holes provided for the escape of gases should become accidentally closed, as is often the case in batteries when the cover is formed of wax.

The clamp for securing the conducting-wire to the negative conducting-electrode F is very simple in construction, and can be easily applied to form a firm contact between the conducting-wire and the conducting-electrode.

Having thus fully described my invention, I claim as new and desire to secure by Letters Patent—

1. In a galvanic battery, the combination, with a porous cup, of a negative electrode provided with longitudinal grooves for the escape of the gases forming in the said porous cup, substantially as shown and described.

2. In a galvanic battery, a cup of porous clay provided with a cover through which the negative conducting-electrode passes, said cover being part of the body of the cup and of the same material, substantially as shown and described.

3. In a galvanic battery, the combination, with a negative conducting-electrode provided on its outer end with a recess, of the conducting-wire extending at one end into the said recess, a clamp surrounding the outer end of the said electrode and provided with a screw screwing against said wire, so as to press it tightly in contact with the electrode, substantially as shown and described.

4. In a galvanic battery, a porous cup provided with a cover having a central aperture, and being part of the body of the cup and of the same material, in combination with the negative conducting-electrode held in said porous cup and extending through the aperture formed in said cover, the negative material packed in the said porous cup and around the said negative conducting-electrode, and a sealing material forming the bottom of the said porous cup, substantially as shown and described.

5. In a galvanic battery, the combination, with a jar and the positive and negative electrodes, of a sealing-cup provided with flanges held on the top edge of the said jar, the said cup being provided in its bottom with apertures for the passage of the said electrodes, and also provided on its outside with grooves for the escape of gases in the said jar, substantially as shown and described.

6. In a galvanic battery, the combination, with a jar and the positive and negative electrodes, of a sealing-cup provided with flanges held on the top edge of the said jar, the said cup being provided in its bottom with apertures for the passage of the said electrodes, and also provided on its outside with grooves for the escape of gases in the said jar, and a sealing material held in the said sealing-cup and covering the clamps of the said electrode, substantially as shown and described.

HORATIO J. BREWER.

Witnesses:
THEO. G. HOSTER,
C. SEDGWICK.